United States Patent Office 3,399,765
Patented Sept. 3, 1968

3,399,765
OIL PHASE SEPARATION
Ira E. Puddington and Joseph Redmond Farnand, Ottawa, Ontario, Canada, assignors to National Research Council Ottawa, Ontario, Canada, a body corporate of Canada
No Drawing. Filed Apr. 6, 1964, Ser. No. 357,766
10 Claims. (Cl. 209—5)

ABSTRACT OF THE DISCLOSURE

Concentration and separation of an oil phase from dispersed hydrophilic solids is obtained by subjecting an aqueous mixture of the solids to an intensive milling and kneading operation with controlled conditions of viscosity and concentration of the oil phase so that a modified oil phase separates as a distinct layer on an oleophilic mill surface.

---

This invention is concerned with improvements in the separation of hydrophilic solids from an oil or bituminous phase. In particular a process is described for the concentration of the oil phase and separation from dispersed hydrophilic solids in an aqueous system. A process is also described for the concentration, separation, and recovery of an oil phase containing oleophilic solids from an aqueous system.

One source of petroleum is oil-bearing rock, shale, sand or the like, which can be mined and treated to separate the desired oil. The required mining and purification treatments place these sources at an economic disadvantage compared to oil well recovery—unless the deposits are of large extent and a simple separation process is available. The tar sands in the Athabasca region of northern Alberta, which contain about 15% bitumen, are one instance of oil-bearing sands the extent of which and the proximity to pipeline and refinery capacity, make it desirable to develop an economical and efficient process for separating the oil. In mining and in metallurgy generally, the separation of an oleophilic solid from an oleophobic or hydrophilic solid may be necessary to concentrate a mineral value.

In the treatment of oil-bearing sands it has previously been proposed to separate the sand from the bitumen by slurrying in water, liquifying or diluting the bitumen and allowing the sand particles to settle out in the aqueous phase, the oil phase being collected as a fluid overflow. One cold water process used a pebble mill for initial mixing and grinding, followed by an agitator, then a classifier and finally a thickener, the major settling of the sand from the oil slurry taking place in the classifier and thickener. For this process it was necessary to add a diluent, soda ash and a wetting agent. The fluid oil product recovered contained about 2% sand or mineral solids and about 22% water [see L. E. Djingheuzian—Cold Water Method of Separation of Bitumen From Alberta Bituminous Sand—in "Proceedings Athabasca Oil Sands Conference, September 1951," page 185].

Another cold water process for treating bituminous sands involves shearing in water in a trough-type kneader (see Canadian Patent No. 645,043, July 17, 1962—Weingaertner). An enriched bituminous phase is recovered as a pumpable slurry of about 40% bitumen, 51% mineral solids and 9% water.

In the treatment of ores and various other solids, it is known to flocculate suspended solids with selected additives and separates as an overflow or underflow using classifying, flotation or settling apparatus.

An object of our invention is to separate or enrich an oil phase by excluding water and/or solids having hydrophilic surfaces. A further object is to separate (or enrich to less than 30% weight hydrophylic solids) an oil phase from an aqueous system containing hydrophilic solids by a milling-kneading-agitation. Another object is to recover the oil phase directly from the milling apparatus by control of the oil phase properties and the milling surface properties. A further object is to carry out a separate recovery step for the oil phase in a secondary kneading or kneading-agitation zone.

When used in this specification the term "oil phase" means an organic water-immiscible viscous material including solids. The oil phase recovered may comprise up to about 30 wt. percent hydrophilic solids (based on the total oil phase) and may also comprise oleophilic solids. This oil phase is generally grease-like, substantially non-flowing, and normally contains 5% or less of water.

According to one aspect of the present invention the material comprising the oil, bitumen, or other viscous organic material, and the hydrophilic solids are treated in an aqueous medium in a milling apparatus in which the milling objects have hydrophilic surfaces. The mill is selected and operated to provide milling and kneading to the oil phase and solids, and severe agitation to the water. Unexpectedly it was found that if the viscosity and cone penetration of the oil phase are controlled within certain limits and if the milling surfaces are hydrophilic, the oil phase will form into discrete coherent agglomerates which separate from the bulk of the hydrophilic solids and are easily handled. An alternative direct recovery method is to provide that the internal periphery or other surface of the mill is oleophilic causing the oil phase to build up there as an adherent layer which can be removed by a scraper or other means. This direct separation and recovery in a single stage is efficient, requires low capital expense, and the product has desirable properties as outlined below.

In order to collect the oil phase as discrete agglomerates it is necessary that the viscosity or plasticity of this phase be sufficient to retain a coherent plastic shape but insufficient to prevent aggregation of the oil phase globules (i.e. agglomerate formation). This lower limit can be satisfactorily defined in terms of viscosity units. At the operating temperature the viscosity should be equivalent to at least about 2500 Saybolt Universal seconds at 100° F. Preferably the oil phase viscosity is above 3000 S.U.S. (100° F.). This refers not to the pure oil or bitumen viscosity, but to the viscosity of the oil phase as it forms in the mill (which includes solids). At the upper end of the range for agglomerate formation the oil phase has a consistency like heavy lubricating grease, and usual viscosity measurements become almost meaningless. However, the cone penetration values have been found to satisfactorily indicate the upper limit for agglomerate formation. Thus the oil phase should have a standard cone penetration of greater than about 50, preferably greater than 100 (A.S.T.M. D217–60T, issued 1952, revised 1960). The stated limits of viscosity and penetration are affected not only by the nature of the oil (or bitumen, etc.) but also by the solids particle size, degree of affinity for the oil, and concentration. Materials forming an oil phase more fluid than above indicated result in emulsions or liquid supernatant layers. Materials forming an oil phase harder than stated above tend to give dispersions of brittle particles high in solids.

When agglomerate formation is desired it is also necessary that the oil phase not wet or adhere to the milling surfaces. These surfaces may be made from hydrophilic materials or coated to provide such a surface. The milling, kneading, and agitation is continued until the oil phase contains less than about 30 wt. percent hydrophilic solids. In general this time may range from 10 minutes to several hours. The agglomerates will usually ride free of the milling objects and non-occluded hydrophilic solids and can be removed in any suitable manner such as screening. The size of the recovered agglomerates tend to increase with milling time until they ride or float free—the size and shape approaching that of the milling objects.

When recovery by adherence to the internal periphery or other milling surface is desired, this surface must be oleophilic and the milling, kneading, and agitation continued until an adherent layer is built up thereon. The oil phase should be fluid enough to permit adherence to and wetting of the oleophilic surface, but not so fluid as to result in significant flowing or dripping. Generally speaking the viscosity and cone penetration limits are the same as for agglomerate formation—with the preferred oil phase having a cone penetration of greater than 150. Continuous recovery can be effected by removing a portion of the layer with a scraper as the mill rotates. The milling, kneading, and agitation should be continued until the layer contains no more than 30 wt. percent hydrophilic solids. A portion of the oil phase removed by the scraper may be returned to the mill, if further treatment is desired.

The operating temperature may be varied to alter the properties of the oil phase. Temperatures as high as 80° C. and as low as 5° C. have been used but it is preferred to operate at or near ambient room or water temperature.

The milling apparatus is conveniently of cylindrical, conical or truncated conical shape rotating about an axis which may be horizontal or at an angle thereto. In some instances it has been found particularly desirable when recovering the oil phase as an adherent layer to employ a conical mill rotating about an axis at a small angle to horizontal. The scraper is preferably located near the top of the rotating mill. Plough-shaped scrapers may be used to return parts of the layer for further milling and kneading. Suitable milling objects include iron or steel balls, pebbles, porcelain, zircon or flint balls, steel rods or tubes and objects with glazed surfaces. The surfaces of these objects are maintained oleophobic or hydrophilic. Porcelain, ceramic glazed or siliceous objects are sufficiently hydrophilic without treatment. Iron or steel objects may often require some coating or treatment. Suitable coatings or treatments will be apparent to one skilled in the art, but one treatment we have found inexpensive and efficient is contacting with caustic soda or potash solution prior to use. When adherence to the internal periphery of the mill is desired, untreated iron, steel or tin has been found sufficiently oleophilic in many instances, particularly when the pH is less than about 7.5. However, it usually is preferred to pretreat the metallic surface with agents such as long chain fatty acids, alcohols and amines ($C_8$–$C_{18}$) to provide an oleophilic coating. Alternatively the container can be fabricated from oleophilic materials or at least provided with a coating or liner of such materials which include natural and synthetic rubber, polyolefins, and synthetic resins.

Continuous conveying systems can be adapted to feed the materials to be treated, to remove the non-occluded hydrophilic solids and to recover the separated oil phase.

In the case of the oil or tar sands, the amount of water added may vary from about 50 to 400% wt. (based on wt. tar sands). The preferred range is 100 to 200 wt. percent water to permit efficient separation and recovery of the oil phase. The continued milling and kneading serves to work increasing amounts of the hydrophilic solids free of the oil phase. The scouring action of the mill is believed to work the major portion of the sand free of oil phase and into the aqueous phase, as well as providing some fresh hydrophilic surface due to the grinding action. At least about 5 to 10 minutes milling is necessary. The milling treatment is normally carried out at or near room temperature i.e. 10 to 35° C. The temperature of course affects the oil viscosity and cone penetration and may be controlled to assure the required values. However, it is usually uneconomical to vary significantly from the normal operating temperature. With some tar sands the oil phase will have a viscosity and cone penetration suitable for agglomerate formation at or near normal operating temperature. However, with many oil sands the oil phase is too fluid at these temperatures to form the desired agglomerates. In this case it is preferable to provide an oil phase viscosity of about 2500 S.U.S. at 100° F. and recover the oil phase as an adherent layer. Within the range of about 2500 to 3000 S.U.S. at 100° F., recovery of the oil phase as an adherent layer rather than as agglomerates is usually more effective. The oil phase viscosity can be increased by adding oleophilic thickeners or binders such as still bottoms, tars, pitch, and peat. Hydrophobic additives such as naphthalene and sulphur have been found to aid agglomerate formation possible by reducing the tendency of the oil to spread on the water phase and excluding water from the oil phase. It is economically undesirable and unnecessary to add a diluent. Diluents tend to discourage formation of, and to decrease cohesion of agglomerates or adherent layers, and give the oil phase a smearing tendency. The addition of wetting agents is also unnecessary and uneconomical. Experiments have shown that the use of hard water (i.e. water containing significant alkaline earth metal ions) or the presence of lime, gypsum, or dolomite in the tar sands prevents or at least renders difficult the formation of the agglomerates. In such cases it is desirable to remove or sequester the Ca ions, for instance by addition of sodium or potassium phosphates, sodium EDTA and sodium zeolites.

The addition of alkali metal hydroxide has been found desirable in the case of tar sands: a more rapid and complete exclusion of the hydrophilic solids from the oil phase has been found to occur. It is desirable but not essential to maintain a pH of 7.5 to 8.5. Also where iron or steel milling surfaces are used, the alkali metal hydroxide aids in maintaining these surfaces hydrophilic.

The invention is useful in the treatment of ore or mineral aqueous mixtures in general. Hydrophobic solids or solids conditioned to be oleophilic can be separated from hydrophilic solids and recovered in a single stage by the addition of an appropriate oil and subjecting the system to the milling, kneading, and agitation described above. The oil used is not restricted to mineral oils—other oily materials such as animal and vegetable oils can be used. The amount of oil required in the oil phase is from about 10% by volume based on oleophilic solids and may range up to about 200% vol. There is normally no advantage in exceeding about 100% vol. of oil. Where high specific gravity oleophilic solids are to be agglomerated and it is desired that the agglomerates rise free of the milling objects, larger amounts of high viscosity low specific gravity oil can be advantageous to reduce the specific gravity of the resulting agglomerates. Selected low specific gravity oleophilic solids may serve a similar purpose. The processing in the mill and the product recovery is carried out in a similar manner to that described for the tar sands. Generally speaking, the process will not reduce the hydrophilic solids in the oil phase to below about 5 to 10%.

The product recovered from treating tar sands has desirable properties rendering it particularly suitable as a feed for a fluidized bed coker or distillation-cracking apparatus. The water content of the product is generally less than about 5%, giving a low heat requirement for subsequent processing. Various tar sand samples have rendered products having from 10 to 30% solids. This amount of solids can be handled in conventional fluidized bed systems.

The invention therefore relates to a process of concentrating and separating an oil phase from hydrophilic solids and directly recovering the oil phase in a single stage, comprising mixing an oil phase and hydrophilic solids in an aqueous medium, subjecting the aqueous mixture to concurrent milling, kneading, and agitation, providing that the viscosity of the separated oil phase is not less than about 2500 S.U.S. (at 100° F.) and the cone penetration is not less than about 50, and recovering the oil phase as discrete coherent agglomerates when the milling surfaces are hydrophilic and as an adherent layer when part of the milling surfaces are oleophilic.

The following examples will illustrate the invention:

EXAMPLE 1

A coal ore comprising about 10 to about 20% by weight coal mixed with sandstone and clay (and containing about 0.001% germanium in the coal phase) was preground to about 0.25 in. or 4 mesh. The ground ore was mixed with about 300% by volume of water (based on total ore) and crude petroleum oil (viscosity about 900 S.U.S. at 100° F.) in amount of about 100% by volume (based on the coal solids) was then added. This mixture was subjected to concurrent milling, kneading, and agitation in a cylindrical ball mill for about two hours. The temperature of the mixture during treatment was 20° C., and the milling objects were porcelain balls. The mill interior was iron which had been pretreated with alkali to give a suitably hydrophilic surface. The two hour treatment resulted in the agglomeration of the oil and coal into oil-bonded, compact masses having an average diameter about two-thirds the diameter of the porcelain balls. The agglomerates contained about 5% sandstone and clay. The viscosity of this oil phase was about 3000 S.U.S. at 100° F. These agglomerates floated free of the balls and were readily recovered and easily handled. Over 90% of the germanium was recovered in the agglomerates—the germanium concentration in the agglomerates ranging from about 0.01 to about 0.05% and in the tailings being less than about 0.0004%.

EXAMPLE 2

An iron ore from the Peace River region of Alberta containing hydrated iron oxide (as goethite) in concentric envelopes alternately with silica forming grains of a diameter about ⅓₂ inch to ³⁄₁₆ inch was treated. The ore was coarsely ground and added to an excess of water in a cylindrical ball mill in which the milling surfaces were hydrophilic. Two experiments were carried out in which (a) crude tall oil, viscosity about 2000 S.U.S. at 100° F., and (b) acid petroleum oil, viscosity 196 S.U.S. at 210° F. were added in amounts of about 100% by volume based on the iron oxide. The ball mill operation was carried out for about one hour and the hydrated ferric oxide was found to be agglomerated into oil-bonded spheres leaving an iron-poor siliceous residue in suspension. The agglomerates were of equivalent size to the milling objects and were easily handled, having a cone penetration of about 200 in both instances. The agglomerates contained about 75% by weight of $Fe_2O_3$ compared to about 63% $Fe_2O_3$ in the original ore. Silica was reduced from about 20% in the original ore to about 10% in the agglomerates. Calcium carbonate (as CaO) was increased from about 4% in the ore to about 10% in the agglomerates—the calcium carbonate acting as a desirable flux in subsequent refining. Fine grinding (virtually to a slime) as occurred during the ball mill operation is necessary for this particular ore in order to separate the $Fe_2O_3$ and silica since the alternate layers are very thin.

EXAMPLE 3

An iron ore containing 50.0% $Fe_2O_3$ and 16.0% $SiO_2$ was mixed with water, milled and kneaded in a porcelain ball mill for one hour with tall oil and Lloydminster crude oil, using these reagents at concentrations of 30 lbs. and 200 lbs. respectively per ton of ore. The agglomerated concentrate recovered from the mill contained 92% of $Fe_2O_3$ and 4.6% of $SiO_2$ while the tailings contained 42% of $Fe_2O_3$ and 37% of $SiO_2$. Eighty two percent of the available iron was recovered in the concentrate. The agglomerate concentrate or oil phase had a cone penetration of about 150.

EXAMPLE 4

Athabasca (Alberta) tar sands containing about 15% by weight viscous oil in finely divided silica and clay were subjected to concurrent milling, kneading, and agitation in both ball and rod mills. Both the interior of the mill and the milling objects were chosen to have hydrophilic surfaces. A series of experiments was run in which amounts of water ranging from 100% by volume to 400% by volume were added to the sands and the temperature adjusted within the range of about 15 to 35° C. by varying the water temperature. The mills were operated to give a severe milling, kneading, and agitation treatment to the mixture for times ranging from about 20 minutes to two hours. Agglomerates were found to form within this time containing from about 10 to about 25% by weight solids—these agglomerates rising free of the milling objects and being readily recovered. The addition of pentaerythritol or similar silica dispersing agents was found to accelerate the oil separation into agglomerates in some cases. Adjustment of the pH with alkali metal hydroxide to about 7.5 to 8.5 was also found to accelerate the agglomerate formation. Details of one example are summarized in Table 1.

TABLE 1.—OIL AGGLOMERATION FROM TAR SANDS

|  | Percent | |
| --- | --- | --- |
|  | Oil | Sand |
| Original sand | 16.5 | 83.5 |
| Concentrate (21% of sample) or agglomerates | 72 | 28 |
| Tailings (79% of sample) | 1.5 | 98.5 |

Total oil recovered in concentrate, 93%.
Water content of concentrate, 3.8%.
Ash content of concentrate about 12%.
Cone penetration of concentrate about 200.

Greater than 90% of the oil or tar is recovered by this treatment. The agglomerates contained less than 30% sand and less than 5% water—making an attractive feed for a fluidized coker or distillation-cracking apparatus. Small amounts of finely divided oleophilic solids such as coal, coke, still bottoms and foamed polystyrene may be added to decrease any smearing tendency of the agglomerates and to decrease the specific gravity, and aid recovery.

EXAMPLE 5

A brine solution containing about 6% sodium chloride by weight contained colloidally dispersed, about 6% by weight of hydrated iron oxides (waste from electrolytic machining). The slurry was quite viscous and on prolonged standing settled to leave less than 20% by volume of clear liquid. When this slurry was subjected to rolling in a cylindrical container with a few glass balls in the presence of 6% of an oil composed of 60% by weight of a crude oil originating in Lloydminster, Saskatchewan and 40% of crude tall oil, the suspended metal oxides coagulated and shrank to a few agglomerates (oil phase) which had a consistency similar to that of a #1 cup grease, i.e. a cone penetration of about 240. From 100 grams of original slurry 91 grams of clear brine were decanted after treatment. Small additions of amines such as dodecyl amine gave some improvement in the rate and degree of agglomeration. Sulphonated petroleum oil in equivalent quantity was successfully substituted for the tall oil.

EXAMPLE 6

A sample of tin ore containing about 0.4% of tin with one and one-half times its weight of water was ground in a porcelain ball mill with 0.2% phenylarsonic acid and 3% Lloydminster crude oil for two hours. The pH of the system was adjusted to 4.8 at the start of the grind. The pH was found to affect the recovery and percent tin in the agglomerates differently—the above pH representing an appropriate compromise. Eighty-three percent of the tin was recovered in a concentrate that was 6.8% of the weight of the original ore sample. The concentration of tin in the concentrate was 5.3% and in the tailings 0.08%.

A similar sample of tin-containing ore dispersed in water was ground for 2 hours with 0.2% crude tall oil and 3% Lloydminster crude oil. The pH of the system was adjusted to 3.1. The concentrate contained 65% of the available tin in 5.2% of the original ore. The percentage tin in the concentrate was 6.45.

A similar experiment in which the concentrate was collected on the peripheral surface of a steel drum showed over 90% of the tin concentrated in 29% of the ore. The concentration of tin in the concentrate was over 1.44% and in the tailings 0.04%. The unconditioned hydrophilic solids were less than 30% of the concentrate.

The following example illustrates the recovery of the oil phase from tar sands as an adherent layer.

EXAMPLE 7

Three different tar sand samples from Alberta were subjected to milling, kneading, and agitation according to the present invention, but instead of recovering the oil phase concentrate as discrete agglomerates this phase was recovered as an adherent layer on the mill periphery and removed by a scraping blade. The recovered oil phases had cone penetrations within the range 190 to 250. Porcelain or flint balls were used in a tin drum, and in some instances a rubber liner was used. 100 parts by weight of tar sand were mixed with 150 parts by weight of water and the results are summarized in Table 2.

From Example 5 the invention will be seen to relate generally to a process of concentrating and separating an oil phase containing solids (including oleophilic solids or solids conditioned to be oleophilic) from an aqueous system. In some cases it has been found desirable to postpone recovery of the oil phase until the milled material is fed to a recovery zone where kneading-agitation predominates (for recovery as agglomerates), or where kneading in contact with an oleophilic surface is carried out (for recovery as an oleophilic layer). In the latter instance the oleophilic surface need not be an internal container surface, but can be, for instance, an external roll surface, a moving belt surface or a fluid oleophilic layer. Recovery in a separate zone in this manner can be more readily made continuous and is preferred.

ing in opposite directions at about 100 r.p.m. The kettle was fitted with a water backwash inlet and an outlet for removing the oil phase. 150 grams of heavy mineral oil (Lloydminster crude) was placed in the bottom of the kettle. 2 kilograms of a siliceous tin ore from New Brunswick containing about 0.9% tin was pre-ground in a porcelain jar mill to −200 mesh to free the tin mineral. The milling was carried out in the presence of 0.2% tall oil and 50% water. The resulting conditioned aqueous slurry was then added to the kettle in batches containing about 250 grams of solids—each batch being stirred in the container for 15 minutes, backwashed with water to remove tailings and the tailings and oil phase sampled for each addition of ore. In all cases the tailings contained less than 0.05% tin (below the limit of accurate assay by the method used). The tin in the oil phase concentrate ranged from 2.6 to 3.5% (based on the solids in the oil phase). About 98% of the available tin was recovered from the 2 kilogram sample.

For continuous operation the ground slurry could be fed intermittently or continuously, the system backwashed as necessary to remove tailings and the oil phase removed intermittently or continuously, e.g. by a worm gear or other suitable means. The oil phase gradually becomes loaded with solids and collects at the bottom. The double action stirrer is believed to give an efficient kneading-agitation action bringing the solids in repeated contact with fresh oil phase surface.

We claim:

1. A process of reducing the hydrophilic solids content of a bituminous sand composition, comprising (a) adding 100%–400% by weight of water to said bituminous sand composition to form an aqueous mixture, (b) subjecting the aqueous mixture to milling to expose hydrophilic surfaces in the solids, to kneading, and to agitation by milling surfaces whose peripheral portions are oleophilic until an oil phase separates, the kneading, or milling plus kneading bringing said oil phase in intimate contact with the oleophilic surfaces, (c) controlling the amount of bitumen and hydrophilic solids and the temperature of said bituminous composition in said oil phase so that a final modified oil phase has a viscosity not less than 2500 S.U.S. at 100° F. and a cone penetration not less than 100, and (d) recovering said phase as an adherent layer from said oleophilic milling surfaces containing less than 30% wt. solids, and less than 5% water.

TABLE 2.—OIL PHASE SEPARATION AS ADHERENT LAYER FROM TAR SAND

| Treating time (min.) | Temp., °C. | Additive | Collecting surface | Conc., percent | Tailing, percent | Oil in Tailing, percent | Oil recovery, percent | Comp. of concentrate, percent | | |
|---|---|---|---|---|---|---|---|---|---|---|
| | | | | | | | | Oil | Sand | Water |
| 30 | 25 | | Rubber | 19.3 | 80.7 | | | [1] 14.7 | [1] 84.5 | [1] 0.8 |
| 30 | 60 | | do | 19.5 | 80.5 | 2.2 | 97.8 | 76 | 22 | 2 |
| 30 | 50 | | do | 22.8 | 77.2 | | | 72.8 | 26.2 | 1.0 |
| | | | | | | | | 65 | 30 | 5 |
| | | | | | | | | [2] 11 | [2] 86 | [2] 3 |
| 45 | 25 | 4% bunker C | do | 19.7 | 80.3 | | | 71 | 27 | 2.0 |
| 300 | 50 | 0.5% still bottoms | Tin | 10.8 | 89.2 | 4 | 96 | 87.5 | 11.3 | 1.5 |
| 30 | 50 | | Tin | 14.1 | 85.9 | 5 | 95 | 79.8 | 18.0 | 2.2 |
| 20 | 50 | | Tin | 13.8 | 86.2 | | | 81.6 | 13.8 | 4.6 |
| 20 | 80 | 0.5% paraffin wax | Tin | 14.2 | 85.8 | | | 71.2 | 26.0 | 2.8 |
| | | | | | | | | [3] 13.2 | [3] 86.0 | [3] 0.8 |
| 15 | 25 | | Tin | 18.2 | 81.8 | | | 64 | 34 | 2.0 |
| 30 | 25 | H₂SO₄ to pH 5.1 | Rubber | 20.2 | 79.8 | | | 62.3 | 37.0 | 0.7 |
| 30 | 25 | 1.0% still bottoms | Tin | 17.5 | 82.5 | | | 80.5 | 17.0 | 2.5 |
| 30 | 50 | 0.5% oxidized oil | Rubber | 16.1 | 83.8 | 3.2 | 96.8 | 85.0 | 13.9 | 1.1 |
| 30 | 50 | 0.5% tall oil | Tin | 19.4 | 80.6 | | | 78.6 | 16.4 | 5.0 |
| 45 | 25 | NaOH to pH 8 | Rubber | 15.6 | 84.4 | | | 87.1 | 12.1 | 0.8 |

[1] Original sample A.  [2] Original sample B.  [3] Original sample C.

The following example illustrates the use of a liquid hydrophobic surface that may be restored by agitation to collect desired hydrophobic mineral while the body of the hydrophobic liquid serves as a reservoir for collecting and concentrating the solid hydrophobic mineral. This procedure is particularly advantageous for treating slimes where the solids are ground to −200 mesh.

EXAMPLE 8

A kettle (about 1.5 litre) was fitted with a double action stirrer, i.e. concentric stirrers having blades rotat- 2. The process of claim 1 including the step of feeding the recovered layer to a fluidized bed distillation-cracking apparatus.

3. The process of claim 1 wherein alkaline earth metal ions are present and a sequestrant or precipitant for these ions is added.

4. The process of claim 1 wherein alkali metal hydroxide is added to the water to give a pH of from 7.5 to 8.5.

5. The process of claim 1 wherein small amounts of light or heavy oils and waxes are added to the bituminous phase and the solids content controlled to obtain the required viscosity and cone penetration for the final oil phase.

6. The process of claim 1 wherein the oil phase from step (c) has a cone penetration greater than 150.

7. A process for concentrating and separating from an aqueous dispersion of mineral solids an oil plus-solids phase containing the desired mineral, said mineral solids being selected from the group consisting of metallic oxides and their slimes, and coal comprising: (a) adding a vegetable or mineral oil to said aqueous dispersion, at least one of said mineral solids therein having a surface which is oleophilic to said oil, (b) uniformly mixing the oil throughout said aqueous dispersion to form a three-phase mixture, one of said phases containing the oil plus oleophilic solids, another of said phases containing the hydrophilic solids, (b) subjecting the mixture to milling sufficient to give the desired solids particle size and surface, to kneading and to agitation by kneading surfaces which are essentially hydrophilic except for selected oleophilic peripheral portions, until a modified oil phase separates, the kneading or milling plus kneading bringing the oil phase in intimate contact with the oleophilic portions, (c) controlling the oil temperature and the amount of oil and solids in the oil phase so that a final solids-bearing oil phase is produced having a viscosity not less than about 2500 S.U.S. at 100° F. and the cone penetration is not less than about 50, (d) continuing kneading and agitation action until said oil phase builds up as an adherent layer (on the oleophilic surface) containing no more than 30% wt. hydrophilic solids and less than 5% wt. water, and (e) recovering this layer.

8. The process of claim 7 wherein at least part of the recovered layer is returned to a zone of concurrent milling, kneading, and agitation for further processing and again recovered as an adherent layer.

9. The process of claim 7 wherein the oleophilic portion is selected from the group consisting of rubber, resin, tin, pretreated iron and pretreated steel.

10. A process for continuously concentrating and separating a mineral solid from its gangue said solid being selected from the group consisting of metallic oxide ores, their slimes and coal, comprising: (a) forming an aqueous dispersion of said solids, (b) adding a petroleum or vegetable oil to said dispersion and forming a three phase mixture wherein the desired mineral solid is in the oil phase and the gangue is in the aqueous phase, (b) subjecting the mixture to milling sufficient to give the desired solids particle size and surface, and then to controlled kneading to form said oil phase into a coherent layer and to form fresh oil phase surfaces which make repeated contact with the aqueous phase, until said oil phase contains less than 30% wt. hydrophilic solids, (c) controlling the oil temperature and the amount of oil and solids in the oil phase so that the final oil phase has a viscosity not less than about 2500 S.U.S. at 100° F. and a cone penetration not less than about 50, and (d) removing the final oil phase from the oil phase layer continuously.

References Cited

UNITED STATES PATENTS

| 348,157 | 8/1886 | Everson | 209—49 |
|---|---|---|---|
| 1,420,164 | 6/1922 | Trent | 209—49 |
| 1,510,983 | 10/1924 | Dolbear | 209—166 X |
| 1,667,277 | 4/1928 | Wilkinson | 209—5 X |
| 2,189,698 | 2/1940 | Bierbrauer | 209—49 |
| 2,769,537 | 11/1956 | Reerink | 209—49 |
| 3,153,625 | 10/1964 | Bichard | 208—11 |
| 3,252,662 | 5/1966 | Lyons | 209—166 X |
| 1,585,755 | 5/1926 | Barcherdt | 209—5 X |
| 2,411,873 | 12/1946 | Firth | 18—1 |
| 3,268,071 | 8/1966 | Smith et al. | 209—5 |

FOREIGN PATENTS

| 834,940 | 8/1957 | Great Britain. |
|---|---|---|
| 637,442 | 2/1962 | Canada. |
| 639,050 | 3/1962 | Canada. |
| 645,043 | 7/1962 | Canada. |

HARRY B. THORNTON, *Primary Examiner.*

R. HALPER, *Assistant Examiner.*